(12) United States Patent
Hayden et al.

(10) Patent No.: US 7,619,720 B1
(45) Date of Patent: Nov. 17, 2009

(54) SEQUENTIALLY ADDRESSABLE RADIUS MEASUREMENTS OF AN OPTICAL SURFACE USING A RANGE FINDER

(75) Inventors: Joseph E. Hayden, Spencerport, NY (US); Cormic K. Merle, Rochester, NY (US); Eric L. Wick, Churchville, NY (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 12/019,033

(22) Filed: Jan. 24, 2008

Related U.S. Application Data

(60) Provisional application No. 60/992,200, filed on Dec. 4, 2007.

(51) Int. Cl.
*G01C 3/08* (2006.01)
(52) U.S. Cl. ............... 356/5.01; 356/5.1; 356/4.01; 356/4.1
(58) Field of Classification Search ........... 356/3.01–22
See application file for complete search history.

(56) References Cited

U.S. PATENT DOCUMENTS

| | | | | |
|---|---|---|---|---|
| 4,734,899 A | * | 3/1988 | Van Sluys | 369/44.22 |
| 4,790,651 A | * | 12/1988 | Brown et al. | 356/4.09 |
| 6,088,085 A | * | 7/2000 | Wetteborn | 356/5.01 |
| 2002/0071109 A1 | * | 6/2002 | Allen et al. | 356/5.01 |
| 2003/0179362 A1 | * | 9/2003 | Osawa et al. | 356/4.09 |
| 2007/0171422 A1 | * | 7/2007 | Birge et al. | 356/450 |
| 2007/0171425 A1 | * | 7/2007 | De Groot et al. | 356/478 |
| 2008/0100821 A1 | * | 5/2008 | Yabe | 356/4.01 |

* cited by examiner

*Primary Examiner*—Thomas Tarcza
*Assistant Examiner*—Luke D Ratcliffe
(74) *Attorney, Agent, or Firm*—RatnerPrestia

(57) ABSTRACT

A system for measuring distance to an optical surface includes a range finder for transmitting a beam toward the optical surface, and a ring mirror disposed between the range finder and the optical surface. The ring mirror has (a) a circumferential reflecting surface for reflecting a portion of the transmitted beam back to the range finder, and (b) a central aperture for passing another portion of the transmitted beam toward the optical surface. The circumferential reflecting surface is effective in providing a zero reference point for the range finder. The central aperture is effective in passing the transmitted beam to the optical surface for sequentially addressing the optical surface at different locations on the optical surface. The transmitted beam may be steerable for (a) providing the zero reference point circumferentially about the reflecting surface, and (b) providing sequential addresses to locations on the optical surface.

19 Claims, 10 Drawing Sheets

SEQUENTIALLY ADDRESSABLE RADIUS MEASUREMENTS OF AN OPTICAL SURFACE USING A RANGE FINDER

This application claims priority of U.S. Provisional Application Ser. No. 60/992,200, filed on Dec. 4, 2007.

TECHNICAL FIELD

The present invention relates, in general, to the field of optics. More specifically, the present invention relates to systems and methods for testing and aligning optical surfaces, such as primary mirror segment assemblies (PMSAs) of a primary mirror (PM) of a telescope.

BACKGROUND OF THE INVENTION

Metrology devices are known to measure spatial coordinates of an object under test. Examples of metrology devices include laser rangefinders, laser range scanners, photogrammetry cameras, theodolites and electronic autocollimators. For example, a laser rangefinder typically determines the spatial coordinates of an object under test based on a laser beam reflected from points on the object under test. The laser rangefinder generally measures the distance to the object under test by computing a time of arrival of a transmitted pulsed laser beam.

Metrology devices typically operate using a direct line-of-sight to the object under test. In some cases, metrology devices are operated in a cryogenic environment in which the metrology device may be housed in a pressure tight enclosure (PTE). In such an environment, the metrology device may transmit a light beam to the object under test and receive a light beam reflected from the object under test, by using one or more optical windows in the PTE for interrogating the object under test.

There is a need to measure the radius of curvature (RoC) of at least one mirror segment (or PMSA) of a primary mirror (PM) assembled and aligned into a telescope under cryogenic conditions. Measuring the RoC of more than one mirror segment of the PMSA is beneficial in aligning the mirror segments to each other. Additionally, having measured RoC values of all of the mirror segments in the cryogenic environment is useful when diagnosing problems that may be encountered during the alignment process of the mirror segments. If an instrument, external to the center of curvature of the PMSA, is used to measure the radius of curvature, there are limitations in creating reference features that may be viewed from the instrument. This limitation pushes the measurement towards a solution that incorporates the instrument into a region near the center of curvature.

There are several conventional methods of measuring the radius of curvature of a PM. For example, the radius of curvature of a primary mirror may be set mechanically using a spacer rod between a verification hologram and a reference point at the PM vertex with a length equal to the desired radius of curvature. Other locations for the hologram or PM may be used provided that the proper rod length is calculated based on the geometry of the nominal shape of the PM surface and prescription of the hologram.

Fabricating a long spacer rod becomes impractical as the spacing between the PM and the center of curvature null increases. In addition, a spacer rod presents risk to the optical components since the PM is often located below the spacer rod. The spacer rod tip may cause damage to the coating or glass as it contacts the PM surface. Using a spacer rod at cryogenic temperatures requires the use of remotely operated precision positioning hardware, as well as a spacer rod that is calibrated for use at cryogenic temperatures.

As another example, laser finders may be used in conjunction with an interferometer to measure the spacing between the PM and a null assembly. When an interferometer and a null assembly are interferometrically nulled against the PM, a laser finder may be used to measure the 6-DOF (degrees-of-freedom) position of the null and the PM by measuring the coordinates of three or more corner cubes attached to each PMSA. A coordinate measuring machine (CMM) is typically used to measure the relationship between the corner cubes and the boundaries of the PM to which the corner cubes are mounted.

This approach for measuring the radius of curvature requires use of one or more laser finders housed inside a pressure tight enclosure (PTE) operating in a cryogenic environment. Disadvantageously, the PTE needs power and cooling lines. In addition, if the laser finders are mounted on different isolation platforms they become subject to vibration errors. There is also uncertainty associated with the placement of the corner cubes and the CMM measurements of the corner cubes relative to the mirror.

Yet another approach for measuring the radius of curvature of a PM uses a concave spherical mirror of known radius attached to a center-hole fixture that is disposed on the surface of the annular PM. When an interferometer and null assembly are interferometrically aligned to the spherical mirror, the RoC of the PM may be indirectly determined. The position of the spherical mirror is known with respect to three spherical feet supporting the center-hole fixture. Since the center-hole fixture sits at the center of the PM and on the PM surface, any measurement between the null assembly and the sphere may be converted to a distance between the null assembly and the PM.

The center-hole fixture, which is metallic, and the spherical mirror would be exposed to a cryogenic environment. Extensive calibration of the metal fixture and the glass spherical mirror is needed to make this approach viable. Additionally, when a PM is measured while mounted in a telescope, the center hole is typically inaccessible and not visible from the location of the interferometer/null. Use of the center-hole fixture with three spherical feet is only effective when used with a monolithic PM.

As will be explained, the present invention provides a system for measuring distance to an optical surface using a range finder, such as a Leica ADM (absolute distance meter), which transmits a pulsed laser beam to the optical surface.

SUMMARY OF THE INVENTION

To meet this and other needs, and in view of its purposes, the present invention provides a system for measuring distance to an optical surface including a range finder for transmitting a beam toward the optical surface, and a ring mirror disposed between the range finder and the optical surface. The ring mirror has (a) a circumferential reflecting surface for reflecting a portion of the transmitted beam back to the range finder, and (b) a central aperture for passing another portion of the transmitted beam toward the optical surface. The circumferential reflecting surface is effective in providing a zero reference point for the range finder. The central aperture is effective in passing the transmitted beam to the optical surface for sequentially addressing the optical surface at different locations on the optical surface. The transmitted beam may be steerable for (a) providing the zero reference point circumferentially about the reflecting surface, and (b) providing sequential addresses to locations on the optical surface.

A multi-surfaced prism, disposed between the range finder and the ring mirror, is provided for steering the transmitted beam. If the beam is not steered, the multi-surfaced prism need not be provided. The multi-surfaced prism includes two pentaprisms for, respectively, steering the transmitted beam in X and Y planes of an X,Y,Z Cartesian coordinate system, in which the transmitted beam is transmitted and reflected in the Z plane.

Also included in the present invention is a movable mask having a plurality of apertures, disposed between the range finder and the ring mirror, for selectively imaging the optical surface at the different locations on the optical surface. The movable mask is placed at an image conjugate of the optical surface.

Also included is a nulling device disposed between the ring mirror and the optical surface for directing the transmitted beam onto the optical surface.

A pressure tight enclosure (PTE) for housing the range finder and the ring mirror is provided.

A tip-tilt mirror is disposed between the range finder and the ring mirror for aligning an interferometer beam with the transmitted beam of the range finder. Folding mirrors are included for intercepting the transmitted beam of the range finder and lengthening the distance between the range finder and the optical surface.

The range finder may include a laser range finder for transmitting a laser beam toward the optical surface.

It is understood that the foregoing general description and the following detailed description are exemplary, but are not restrictive, of the invention.

BRIEF DESCRIPTION OF THE FIGURES

The invention may be understood from the following detailed description when read in connection with the accompanying drawing. Included in the drawing are the following figures:

FIG. 1a shows a system for providing a stationary range finder beam for measuring the radius of 1 to 4 mirror segments of the PM. FIG. 1c shows a system for providing a steerable range finder beam for measuring the radius of 1 to 18 mirror segments of the PM, for example. FIG. 1b shows the system radiating a beam toward the PM and other optical objects under test.

DETAILED DESCRIPTION OF THE INVENTION

As will be explained, the present invention provides a series of absolute distance measurements to one or more mirror segments of a PM and quickly determines the RoCs of each mirror segment.

As will be explained, the present invention takes advantage of unique geometric properties of an achromatic objective and a reflective null assembly to direct a range finder's beam at normal incidence to the PM surface. This permits multiple sequential radius measurements on any mirror segment of a PM.

The present invention includes a single range finder, multiple fold mirrors, a collimator, mask apertures, scanning pentaprisms, and a reflective null assembly. An example of a ranger finder that may be used by the present invention is an absolute distance meter (ADM) manufactured by Leica. The ADM transmits a 10 mm diameter beam at a wavelength of 780 nm; has a range of 50 meters; and an accuracy of 20 microns in a vacuum environment. The ADM exemplified below is typically used in Leica laser finders. While the ADM uses a laser wavelength, the present invention may be extended to use other wavelengths in frequency bands outside of laser frequencies.

As will be described, an interferometer may also be used by the present invention for testing the PM. As an example, the interferometer may be a 4D multi-wavelength interferometer, generating a 7 mm diameter beam at a wavelength of 660-687 nm. Although not critical to the present invention, the multi-wavelength interferometer is beneficial, however, since it aids in the precise alignment of the objective, null assembly, and verification hologram. It also assures that the ADM beam is normally incident on the PMSA segments at all points on the PM.

Figure 1A:
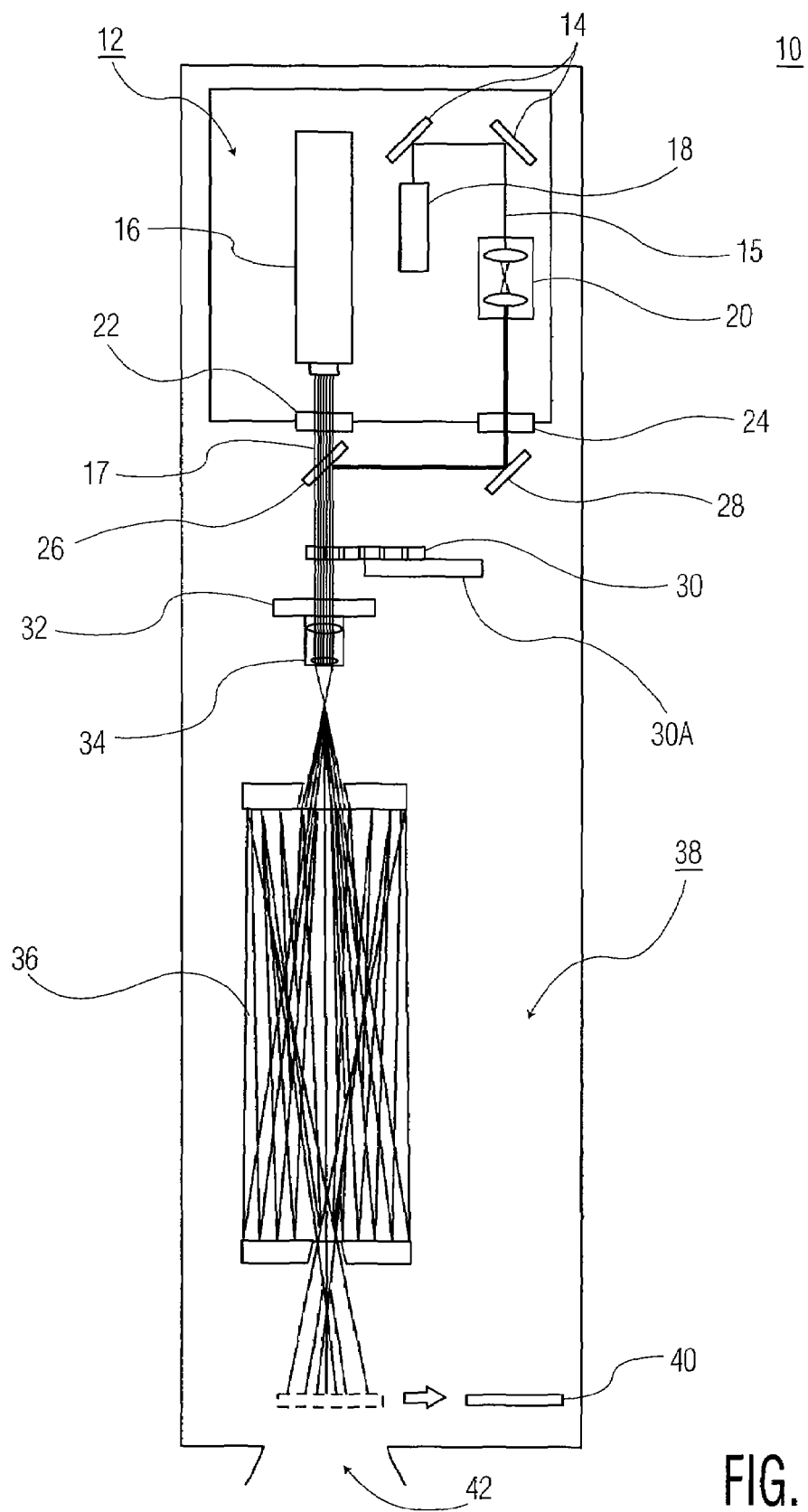
FIGS. 1a, 1b and 1c are functional block diagrams of respective systems for testing and aligning an optical surface, such as an optical surface comprised of mirror segments of a PM, according to an embodiment of the present invention.
Figure 1B:
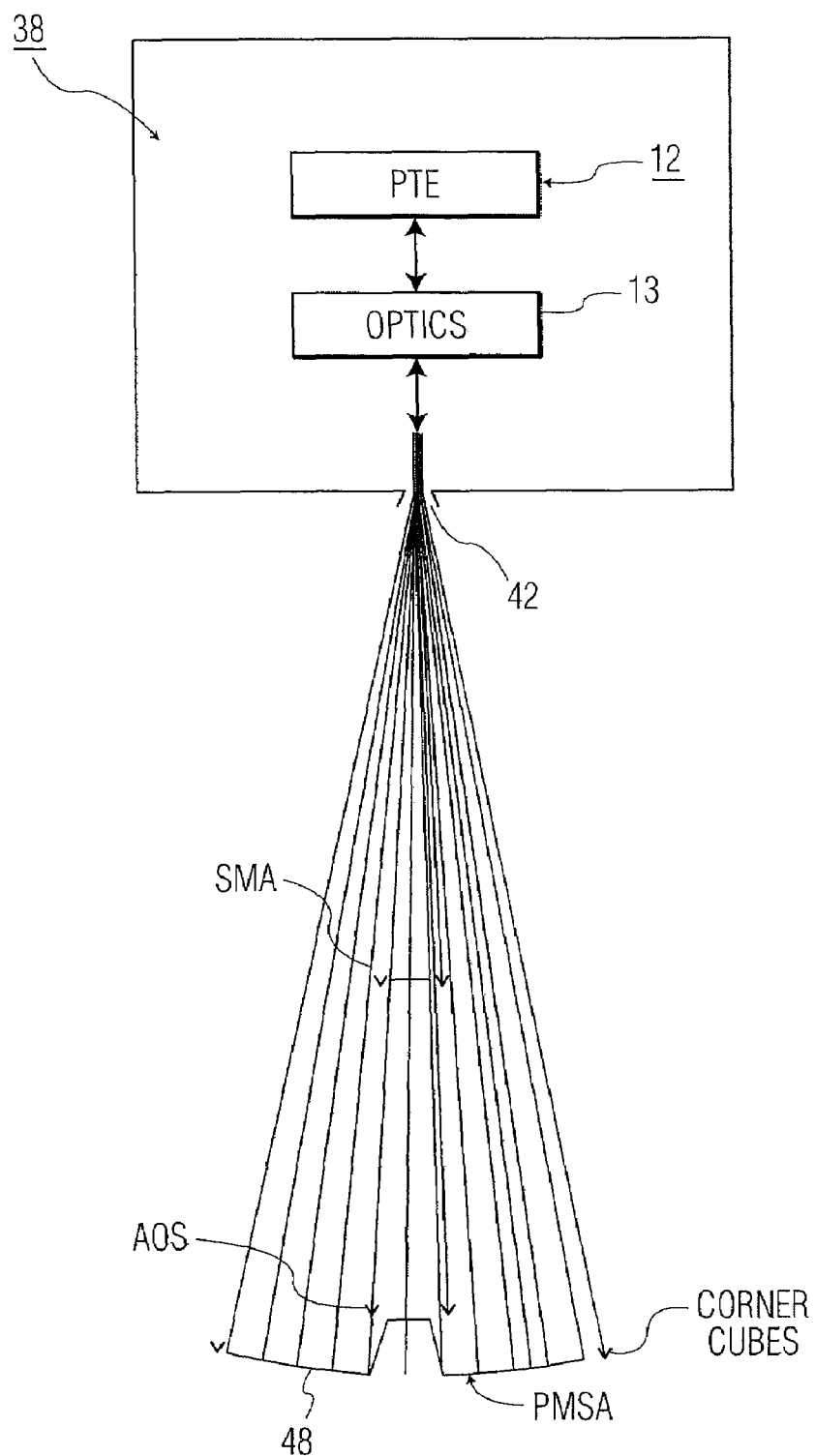
Figure 1C:
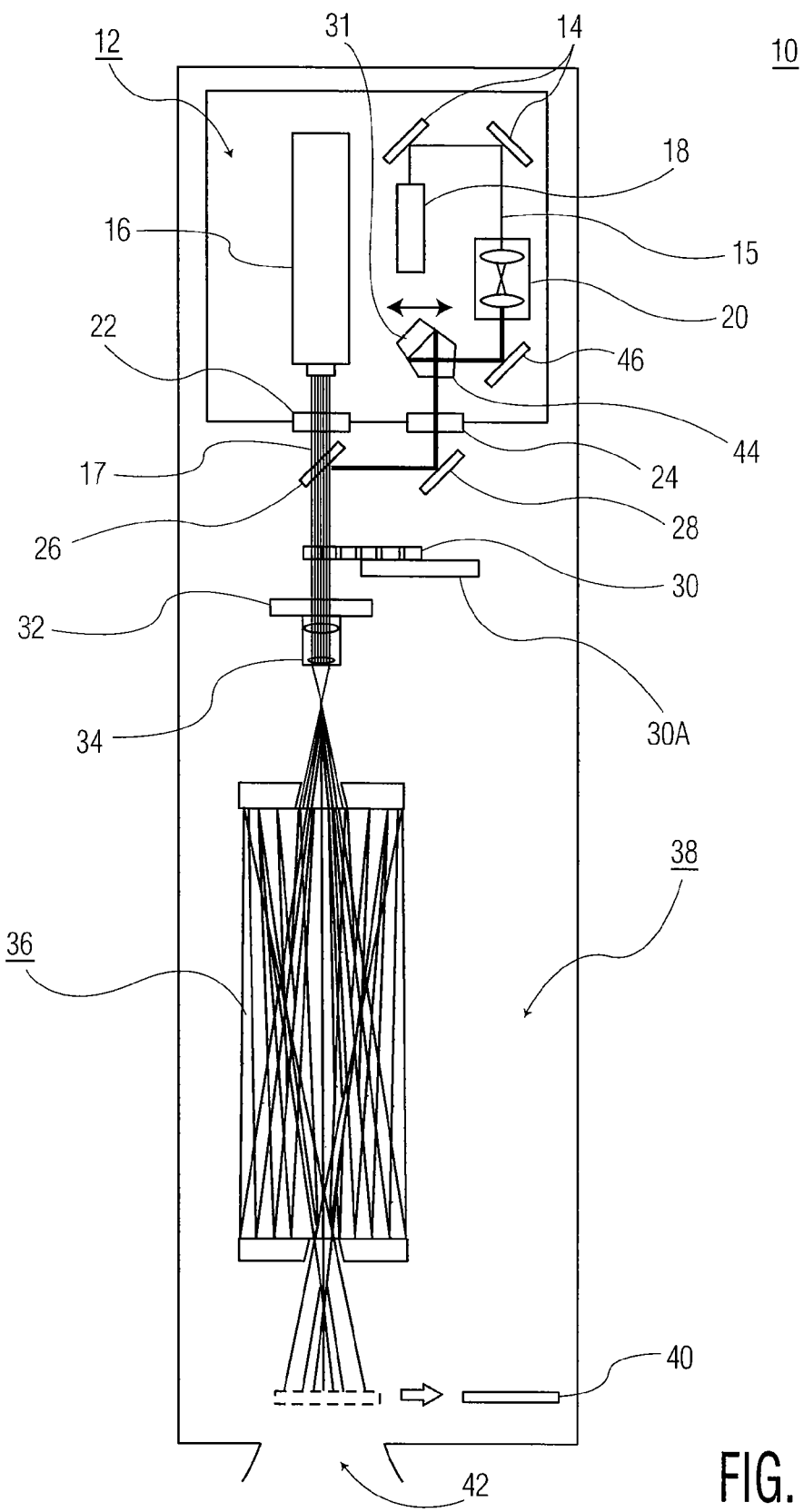

FIGS. 1a, 1b and 1c show an embodiment of a testing system, generally designated as 10. FIGS. 1a and 1c show multi-wavelength interferometer 16 and Leica ADM 18 housed within the same pressure tight enclosure (PTE) having a first environment, generally designated as 12. In turn, the PTE is housed within a second environment, generally designated as 38. As an example, first environment 12 may include a temperature of 293° K and a pressure of $1\times10^{-6}$ Torr. The second environment may include a temperature of 293° K and a pressure of 760 Torr.

Figure 2:
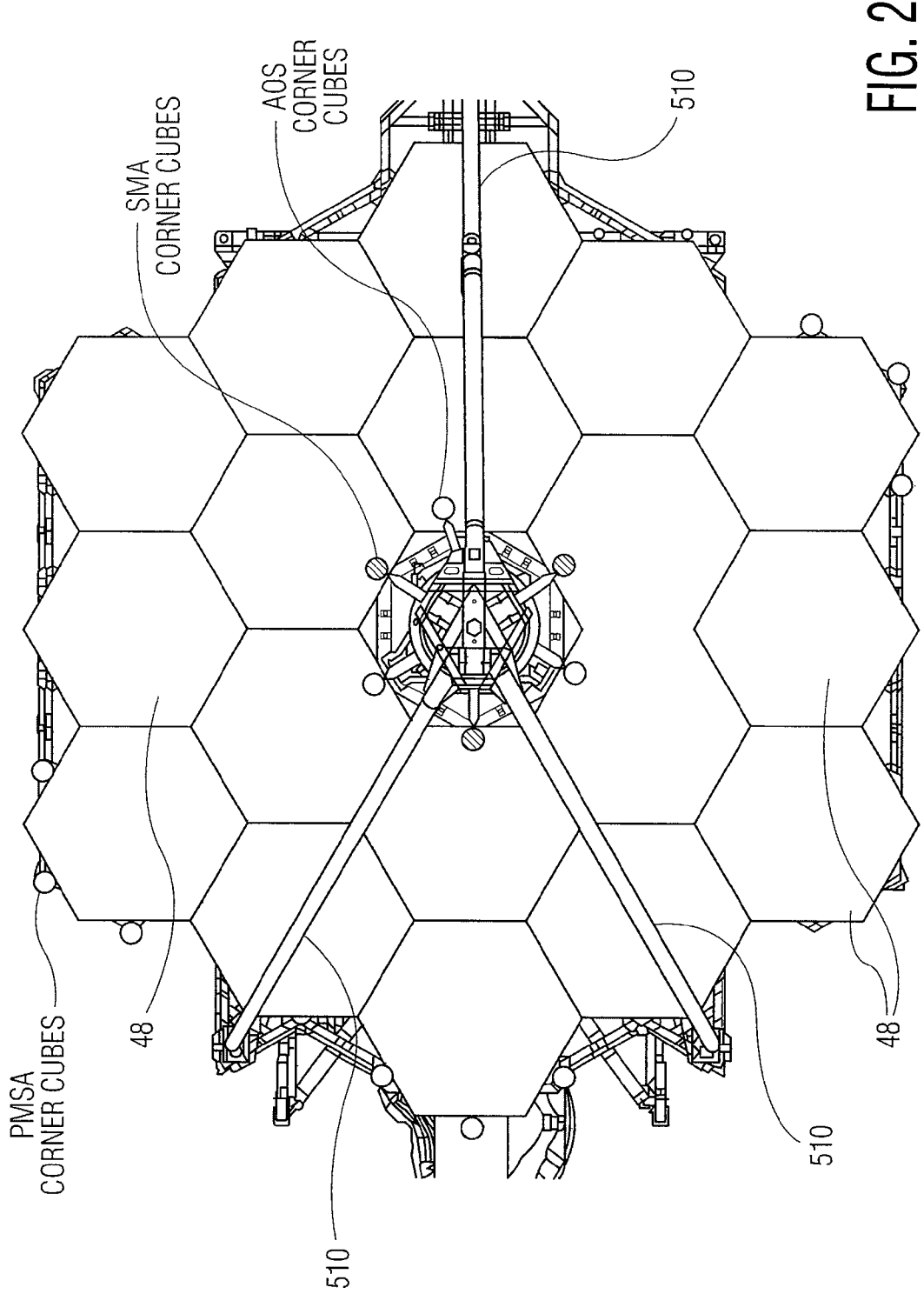
FIG. 2 shows an overhead view of 18 segmented mirrors (PMSAs) of a PM in a telescope, including three struts for supporting a secondary mirror assembly (SMA) and several corner cubes.

The housing of the second environment 38 may be about 3 feet wide by 6 feet high (for example). The housing includes an opening 42 of about 8 inches in diameter. The opening 42 permits light from ADM 18 and/or light from multi-wavelength interferometer 16, transmitted through windows 24 and 22 (FIGS. 1a and 1c), respectively, to pass to the surface under test, as shown in FIG. 1b. As clearly shown in FIG. 1b, light from PTE environment 12 passes optics 13, disposed in environment 38, toward opening 42. The light then passes opening 42 and impinges upon various surfaces under test. For example, multiple surfaces under test may be the PMSA of a telescope, which includes, as an example, 18 mirror segments (each designated as 48 in FIG. 2). As another example, the surfaces under test may include the corner cubes attached to the peripheral mirror segments 48, as shown in FIG. 2. Other surfaces under test may also include the secondary mirror assembly (SMA) of the telescope, the aft optical system (AOS) of the telescope, and/or the corner cubes attached to these respective mirror segments.

Returning to FIG. 1*a*, the interferometer and the ADM are housed within the pressure tight enclosure (PTE) of ambient temperature and pressure. Two respective windows 22 and 24 allow ADM beam 15 and interferometer beam 17 to exit the PTE and propagate toward ring mirror 32. As shown, the ring mirror and a selectable aperture mask (or aperture plate) 30 are both disposed in the second environment 38 that is outside of PTE environment 12. The nulling device 36 is also shown disposed within second environment 38.

The ADM 18 is located inside PTE environment 12 at ambient temperature and pressure. Two fold mirrors 14 are used to extend the ADM beam, designated as 15, by a distance of approximately 2 meters between ADM 18 and optical window 24 in order to accommodate the ADM minimum distance (or time-of-flight). A collimator 20 is used to adjust ADM beam 15, so that it is reduced from a 10 mm diameter at the output of ADM 18 down to a 3.85 mm diameter, for example, at optical window 24. This is approximately a 2.5 times reduction in the size of the ADM beam diameter. In this manner, ADM beam 15 may be properly mapped to overlap the area of interferometer beam 17. This mapped overlap may be seen in FIGS. 4 and 5. The rectangular area 406 denotes the region which is detected by a detector array (not shown) of interferometer 16. The circular area 407 is a central is aperture of ring mirror 32, which allows ADM beam 15 to pass through lens assembly 34 and be reflected off the eighteen mirror segments 48 (the segment 48 at the center of the PM does not include a mirror segment).

Figure 1D:
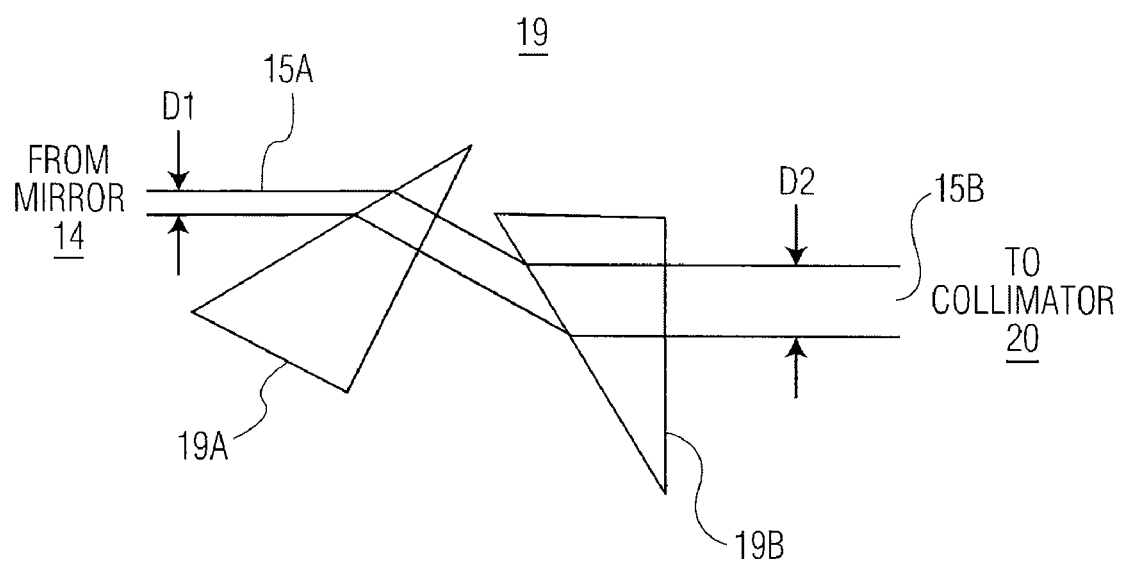
FIG. 1d is a functional diagram showing an anamorphic prism pair inserted in the path of a beam, in order to modify the cross-section of the beam, in accordance with an embodiment of the present invention.

The ADM beam 15, shown in FIGS. 1*a* and 1*c*, is assumed to have a circular cross-section or footprint. In a situation where the ADM beam is of a cross-section other than circular, for example elliptical, it is preferable to modify the elliptical footprint into a circular footprint. Accordingly, an anamorphic prism pair, designated as 19 in FIG. 1*d*, may be used to modify the footprint. As an example, prisms 19A and 19B are configured to intercept ADM beam 15, in order to modify an elliptical beam (shown as 15A) into a circular beam (shown as 15B). The anamorphic prism pair may be disposed anywhere in the path of the ADM beam. As shown in the example of FIG. 1*d*, prism pair 19 is disposed between mirror 14 and collimator 20. As also shown, the input elliptical beam 15A has a narrow diameter of D1 and the output elliptical beam 15B is widened into a circle of diameter D2.

It will further be appreciated that the exemplified ADM 18 has an elliptical footprint which has a 5/4 aspect ratio. In addition, to modify the footprint requires that the longest dimension of the prism pair be less than one inch.

Another fold mirror 46, as shown in FIG. 1*c*, may be used to redirect the ADM beam toward a pair of orthogonally oriented pentaprisms, designated as 44 (otherwise, FIG. 1*c* is similar to FIG. 1*a*). As will be explained below, the pair of pentaprisms 44 are used to scan the ADM beam to six different positions at the plane of an annular ring mirror, designated as 32. It will be appreciated that a pentaprism has a useful optical property, whereby the incident and transmitted beams remain at right angles to each other for small angular changes about one of the three rotation axes of the pentaprism. This insensitivity about one rotation axis reduces pointing errors during steering of the ADM beam.

Two orthogonal pairs of pentaprisms 44 are disposed between the ADM and ring mirror 32. These two orthogonal pentaprisms are movable by an automated XY-stage, designated as 31, and provide steering of the ADM beam in a proper direction, so that portions of the ADM beam may impinge on desired mirror segments of the surface under test. The pentaprisms may be omitted in system 10, as shown in FIG. 1*a*, when steering of the ADM beam is not desired.

As the pair of pentaprisms steers ADM beam 15 to six different positions, the ADM beam is transmitted through the PTE's optical window 24. Continuing in the path of the ADM light beam, ADM beam 15 is folded toward beamsplitter plate 26 by another fold mirror 28. The beamsplitter plate 26 is used to combine the ADM beam with the interferometer beam, the latter designated as 17. On one side of beamsplitter plate (BSP) 26, there is an anti-reflection (AR) coating at 660-687 nm, which is the wavelength range of the multi-wavelength interferometer 16. On the other side of the BSP, there is a high-reflection (HR) coating at 780 nm, which is the wavelength of the ADM.

It will be understood that the AR coating allows interferometer beam 17 to pass through the BSP with approximately 99% transmission. The HR coating causes ADM beam 15 to be reflected by approximately 99% reflection. The interferometer beam, which passes through optical window 22, and the ADM beam, which passes through optical window 24, are substantially parallel to each other regardless of the scan positions of the pair of pentaprisms. The two beams are parallel to each other once combined by BSP 26.

Figure 5:
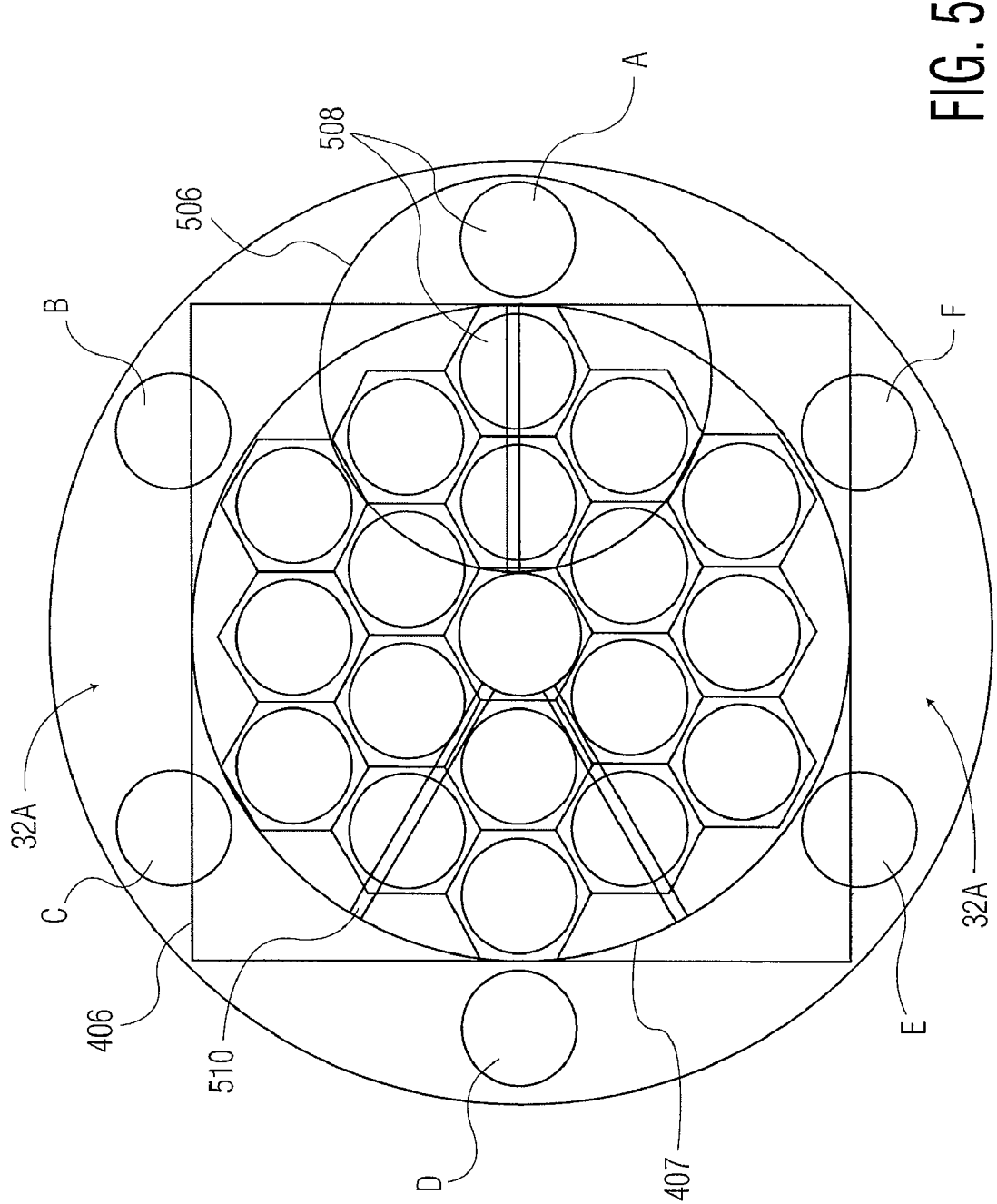
FIG. 5 shows a top view of (a) 18 beamlets passing through a central aperture of the ring mirror of FIG. 4 to impinge upon 18 respective mirror segments of a PM, and (b) 6 beamlets sequentially impinging upon the surface of the ring mirror as the beam of the range finder is steered, in accordance with an embodiment of the present invention.

After being reflected from BSP 26, ADM beam 15 passes through an aperture plate, designated as 30. The aperture plate includes multiple apertures at different locations, such that individual apertures may be selected to allow the ADM beam to sequentially address the 18 mirror segments 48 of the PM (for example). This aperture plate 30 includes 6 apertures to sequentially address 6 locations of the ADM zero reference points on ring mirror 32. As best shown in FIG. 5, these 6 zero-reference apertures correspond to 6 nominal positions of the scanned ADM beam 15.

As shown in FIG. 5, ADM beam 15, prior to passing through aperture plate 30 and prior to impinging on ring mirror 32, includes a full ADM beam (parent beam) having a 3.85 mm diameter (for example). After passing through the aperture plate, the ADM beam includes six beamlets (at different selected scans) each having a 1.16 mm diameter (for example), impinging on ring mirror 32, shown designated as A, B, C, D, E and F in FIG. 5. The full ADM beam (parent beam) is designated as 506 in FIGS. 5, 6*a* and 6*b*; the beamlets are also designated as 508 in FIGS. 5, 6*a* and 6*b*. It will be understood that aperture plate 30 is located at the plane of the image of the PM in order to minimize the effects of diffraction at the apertures.

Figure 4:
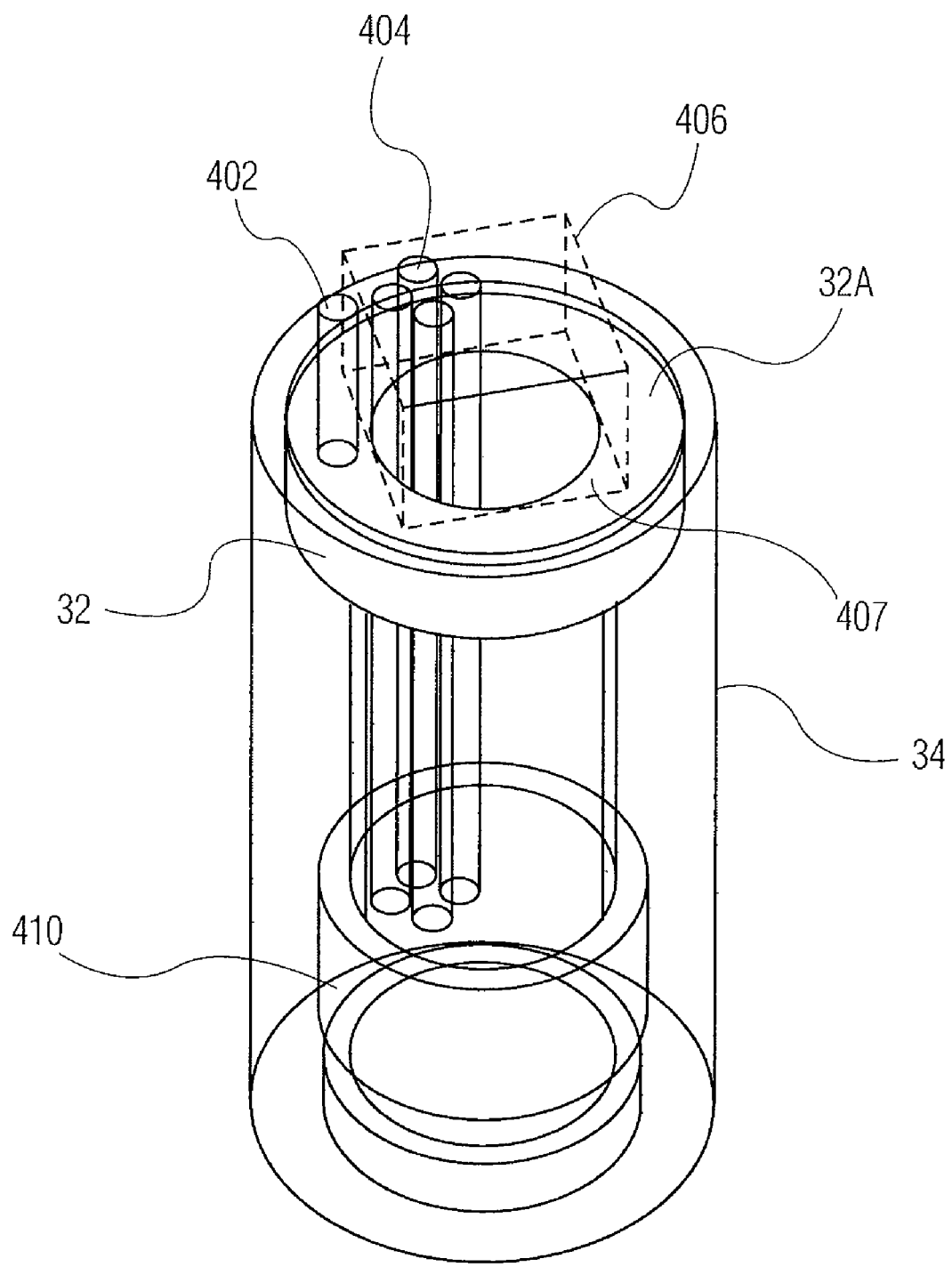
FIG. 4 depicts an isometric view of a ring mirror (top) coupled to an achromatic F/3 objective lens for (a) reflecting a beamlet back to a range finder to obtain a zero reference point, and (b) selectively passing multiple beamlets through the objective lens for measuring distances to surfaces under test, in accordance with an embodiment of the present invention.

As described, the aperture plate includes six apertures for generating corresponding selected six beamlets to reflect off ring mirror 32 for determining six zero reference points by the ADM (only one zero reference point is needed, the other five zero reference points are used to verify the accuracy of the one zero reference point). The ring mirror is used as an ADM zero-reference, so that ADM measurements may be insensitive to optical path length changes caused by steering the beam. Additional apertures are used for generating selected beamlets to pass through the central portion of ring mirror 32 which has an annular configuration, as shown in FIG. 4. After passing through the central portion of the ring mirror, these selected beamlets eventually reflect off a correspondingly selected PM segment. The beamlet that is reflected off the corresponding PM segment may be used to determine the distance to that PM segment.

Figure 6A:
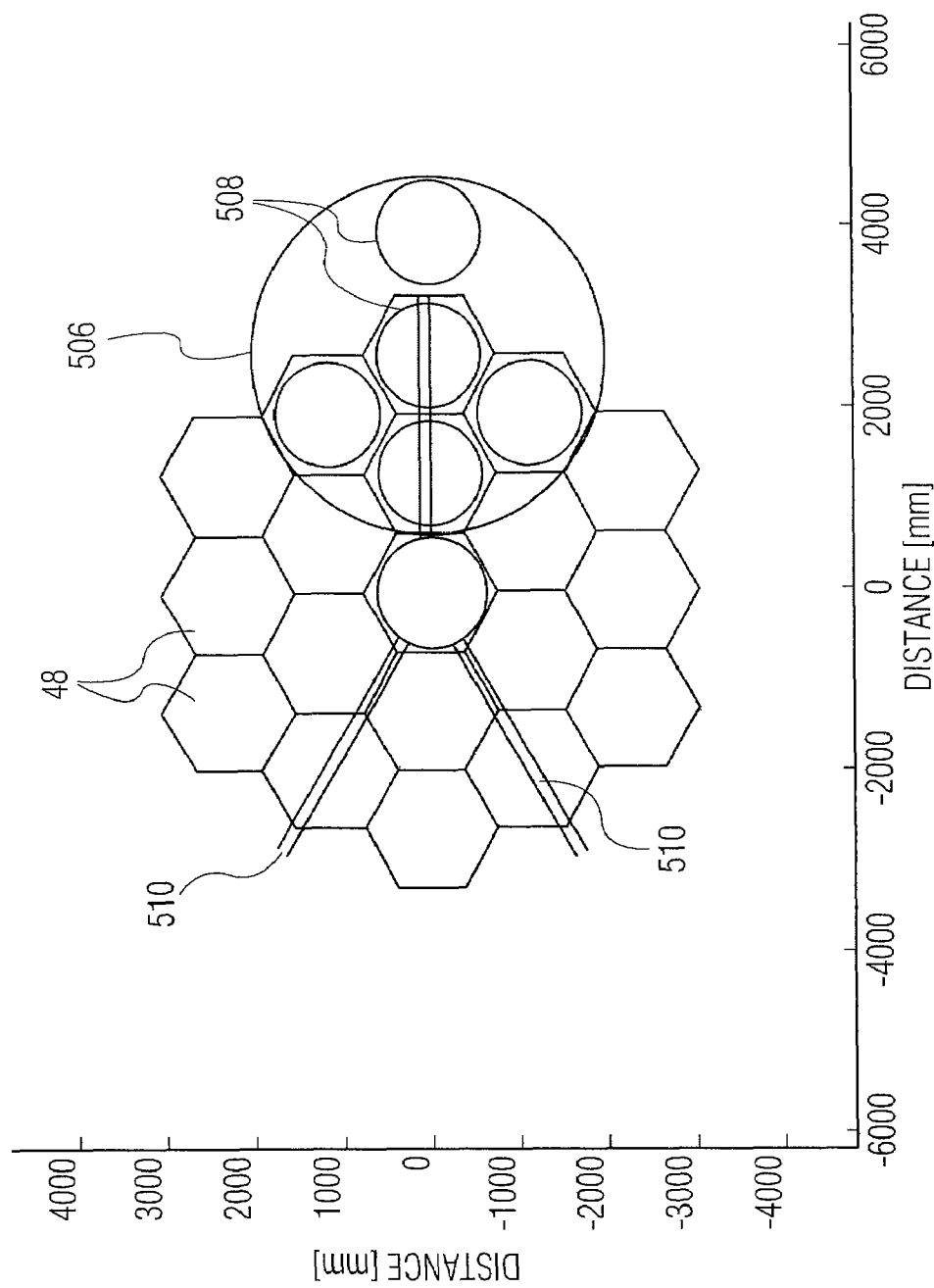
FIGS. 6a and 6b are plots of mirror segments of the PM shown in FIG. 2, as a parent beam of a range finder is divided into 5 selectively steerable beamlets in order to impinge upon different mirror segments of the PM, in accordance with an embodiment of the present invention.
Figure 6B:
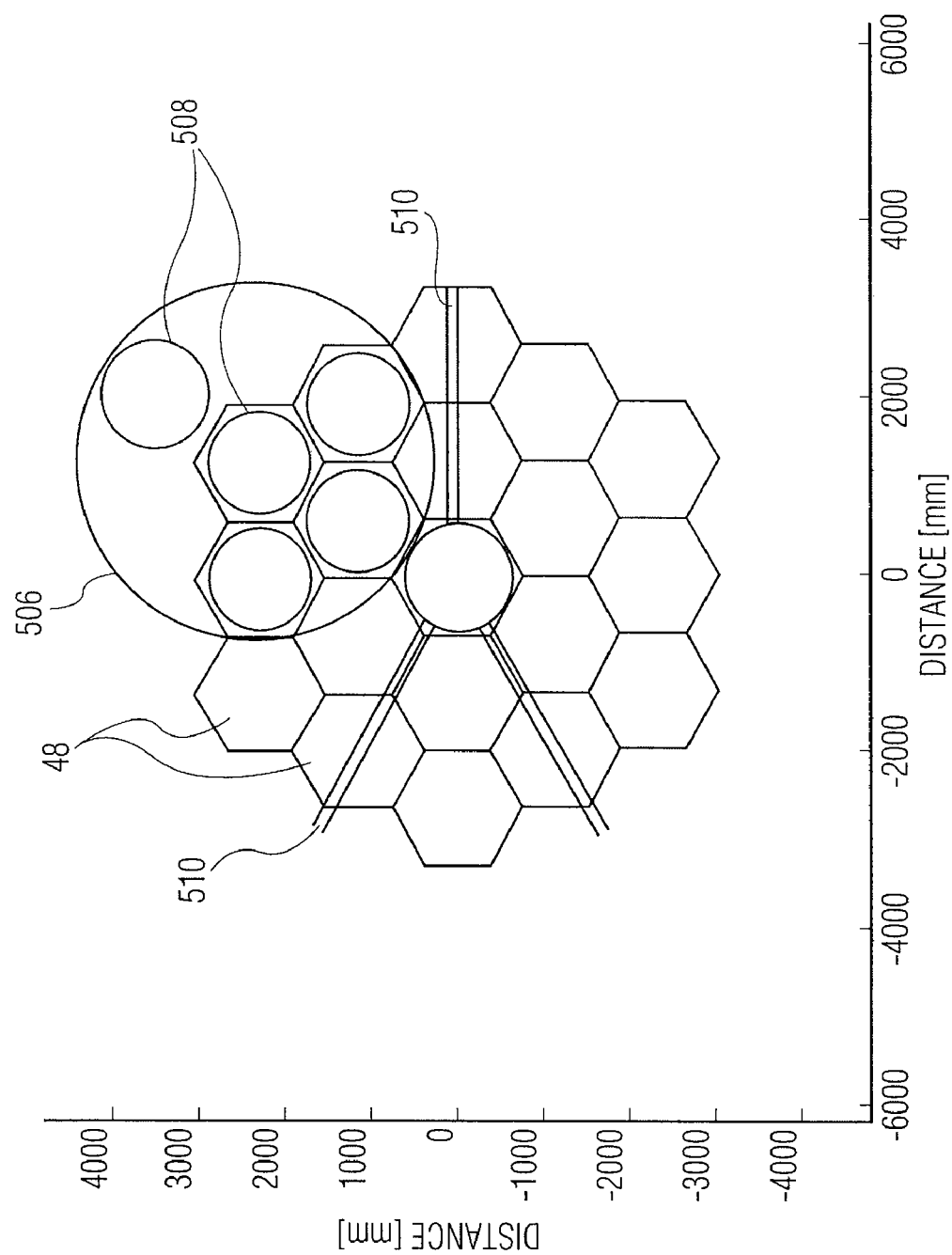

The operation of aperture plate 30 may be better understood by referring to FIGS. 4, 6a and 6b. As shown in FIG. 4, ring mirror 32 includes a central opening which allows beamlets 404 (four are shown) to pass through the central opening (one at a time) and then be transmitted through an achromatic F/3 doublet lens, generally designated as 34. As shown, doublet assembly 34 includes ring mirror 32 and lens doublet 410. A fifth beamlet 402 impinges upon the annular mirror top surface 32A of ring mirror 32. The beamlet 402 is reflected back toward ADM 18 and used as the zero reference point. The four beamlets are allowed to impinge (one at a time) upon four different mirror segments and reflect back to the ADM to determine the distance to the four corresponding mirror segments.

Referring now to FIGS. 6a and 6b, there are shown different positions of two ADM parent beams 506. The parent beam 506 includes five beamlets (passing sequentially through five different apertures of aperture plate 30), designated by 508. The outer beamlet 508 impinges upon the ring mirror and reflects back to the ADM for determining the zero reference point. The four inner beamlets 508 pass sequentially through the central opening of ring mirror 32 and image four corresponding mirror segments. It will be noted that each beamlet 508 is configured to substantially image most of the area of a corresponding mirror segment. It is further noted that the PM shown comprised of 18 segments is only exemplary and any other PM having any number of mirror segments may also be tested by the present invention, using one ADM beamlet at any one time.

In the exemplary embodiment of 18 mirror segments shown in FIGS. 6a and 6b, the central portion of the PM does not include a mirror segment, because the central portion is blocked by the AOS and SMA. Three struts, designated as 510, are used to hold the SMA in place relative to the PM. As shown, the ADM parent beam, or the full aperture beam, is selectively steered towards six different positions of the optical surface under test. As the ADM full aperture beam is steered to six different positions, a portion of the ADM full aperture beam (one beamlet) is reflected from the ring mirror back toward the ADM for providing the zero reference point. Each of the six steerable positions of the full aperture ADM beam impinges upon three unique mirror segments of the PM. In this manner, the six different steerable positions allow for selectively addressing 18 (3 times 6) unique mirror segments of the PM.

In order to determine the distance to each of the 18 mirror segments 48 shown in FIGS. 6a and 6b, aperture plate 30 is moved to six different positions so that five beamlets are steered sequentially around the entire PM. It will be appreciated that 30 different beamlets may be generated (6×5=30) by the aperture plate. Six positions may be used for determining six zero reference points. Twenty four positions may be used for determining the distances to 24 mirror segments (18 unique segments and six redundant segments). The aperture plate may be moved by automated stage 30A, which may be stepped in one dimension.

In operation, using the aperture plate, the ADM beam may generate a point (beamlet 402) on the ring mirror surface 32A to establish a zero-reference point. Next, without moving the parent ADM beam, the aperture plate may be moved to sequentially generate four beamlets (beamlets 404) at four different positions, as shown in FIG. 4. Note that one of the 4 PMSA positions is redundant for each of the 6 ADM parent beam positions and may be omitted, if desired.

The relationship between ring mirror 32 and objective lens assembly 34, shown in FIG. 4, are important. An achromatic F/3 doublet lens 410 is interposed between ring mirror 32 and nulling device 36 (see FIG. 1A) to further focus the ADM beam and the interferometer beam onto the optical surface under test. The ring mirror is pre-aligned, in a permanent way, to the objective assembly. That objective assembly is pre-calibrated on a CMM to measure the relationship between the plane of the ring mirror and the focus of the achromatic F/3 objective. The optical axis of the achromatic F/3 objective is aligned so that it coincides with the center axis of the ring mirror.

Significant optical path length changes occur in ADM beam 15 as the beam is steered, with the pair of pentaprisms 44 shown in FIG. 1c, and transmitted through different areas on PTE window 24. Advantageously, however, the differential measurements between ring mirror 32 and individual PMSAs are unaffected by these optical path length changes. First, the ring mirror distance is measured followed by four PMSA measurements. Each of the four PMSA distances are then measured relative to the ring mirror. The ring mirror is used as a zero reference point for the ADM. Accordingly, the ring mirror is insensitive to optical path differencing (OPD) changes due to the pentaprisms steering mirrors or the PTE windows.

It will also be appreciated that the reflective null assembly 36 plays an important role in the present invention. The null assembly 36 bends ADM beam 15 in the same way as the null assembly bends interferometer beam 17. In other words, the null assembly provides normal incidence to the PM segments for all ADM beam positions. The ADM beam reflects off the PM segments and returns on itself back to ADM 15.

Figure 3:
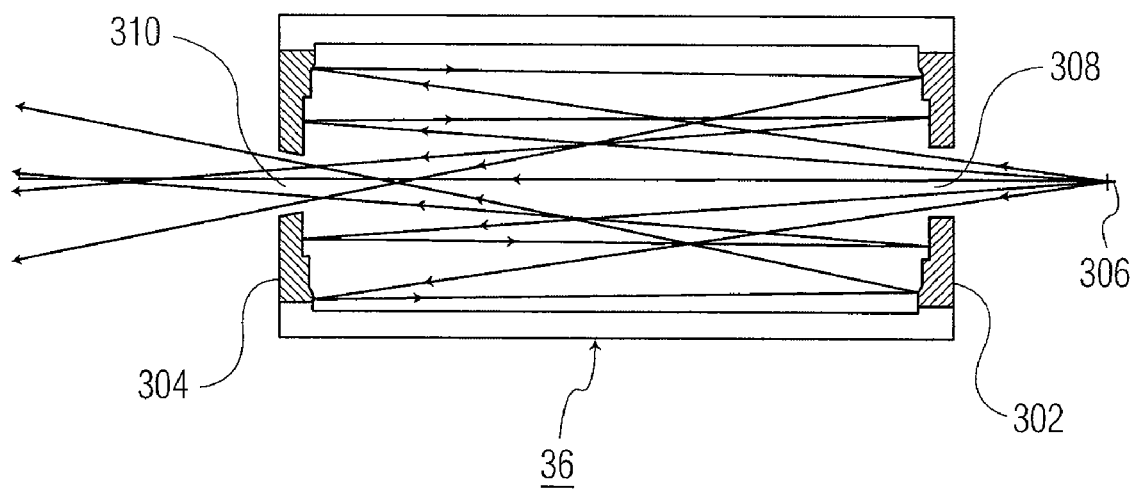
FIG. 3 is a functional diagram showing radiation beams reflecting between an aspheric mirror and a spherical imaging mirror of an null assembly, in accordance with an embodiment of the present invention.

Referring to FIG. 3, there is shown a null assembly, or a null device, generally designated as 36. The null assembly includes aspheric mirror 304 and spherical imaging mirror 302. The ADM beamlets and the interferometer beam arriving from PTE 12 may enter null assembly 36 through aperture 308 in spherical mirror 302. The beams reflect off the surface of aspheric mirror 304 and travel back to spherical imaging mirror 302. The beams are then reflected in the other direction through aperture 310 in aspheric mirror 304, eventually passing through aperture 42 of the second environment 38 (FIG. 1a).

After reflecting from the PM, the light beams re-enter aperture 42 and then re-enter the null assembly by passing through aperture 310 in aspheric mirror 304. Next, the light beams reflect from the spherical imaging mirror and then reflect from the aspheric mirror to eventually pass through aperture 308, to focus at point 306. The light beams continue from point 306, eventually returning to the ADM or the interferometer for further processing.

A verification article, such as a computer generated hologram (CGH), designated as 40 in FIGS. 1a and 1c, is shown removably positioned in the light beam path, prior to the light beam exiting aperture 42. It will be appreciated that the CGH is not used with the ADM and is positioned in a stowed position, so that the CGH does not intercept ADM beamlets transmitted to the mirror segments. The CGH may, however, be used during calibration of the interferometer beam and during pre-alignment of the interferometer beam to the parent ADM beam.

It is estimated that all 18 mirror segments and the 6 zero reference points on the ring mirror may be measured in under 2 minutes. The aberrations associated with transmitting the ADM beam through the F/3 objective and the null assembly are negligible relative to the 20 micron accuracy of the ADM.

It will be understood that the present invention may also be operated without the annular ring mirror. Instead, an alternative zero reference point may be disposed between the ADM and the objective lens assembly. For example, a spherical mirror mounted between the objective lens and the null assembly may be used as a zero point reference. The spherical mirror may be annular in shape, similarly to the ring mirror, or it may intercept the entire ADM beam. If the spherical mirror covered the entire beam, the spherical mirror may be moved out of the path of the ADM beam, similarly to the manner in which CGH 40 is moved into a stowed position. Once stowed, the ADM beam may propagate toward the PM. In order to obtain correct measurements, however, each time the spherical mirror is moved back into the operational position, the spherical mirror would require realignment using the interferometer.

Another reference surface, for example an aspheric mirror (asphere) disposed between the null assembly and the PM may be provided by the present invention. The asphere may be used to reflect the rays coming out of the null assembly back on themselves. The asphere may be annular in shape, and may be operated in a stationary position (or may be operated by moving the asphere from a stowed position to an operational position). Using the asphere, or the spherical mirror, of course, requires knowledge of the optical path length between the reference surface and the paraxial center of curvature of the PM.

Table 1 below summarizes the multiple slide positions of the movable aperture plate (or mask) 30 which is used for generating the ADM beamlets by spatially narrowing the parent ADM beam. As shown, to address all the mirror segments (in the example of the embodiment, there are 18 primary mirror segments) the mask includes 18 slide positions. The ring mirror zero reference point is provided by a single slide position. By steering the ADM beam to six different positions, six zero reference points may be determined in sequence and all 18 mirror segments may be addressed in sequence. The rectangular aperture (shown in FIGS. 4 and 5 as element 406), which encompasses the entire PM and the corners of the ring mirror, may be provided by one slide position.

TABLE 1

TWENTY SLIDE POSITIONS OF THE MOVABLE APERTURE PLATE

| FEATURE | SLIDE POSITIONS | ADM STEERING POSITIONS | USED FOR INTERFEROMETRY | USED FOR ADM |
|---|---|---|---|---|
| All PMSA apertures | 18 | 6 | Yes | Yes |
| Ring mirror zero reference | 1 | | No | Yes |
| Rectangular aperture encompassing PM and corners of ring mirror | 1 | 0 | Yes | No |

The interferometer beam is nulled against the ring mirror, thereby, insuring that the interferometer beam is normally incident on null assembly 36.

Table 2 below lists some of the advantages of using the multi-aperture ADM beam of the present invention, when used together with a nulling device.

TABLE 2

ADVANTAGES OF MULTI-APERTURE ADM BEAM THROUGH A NULLING DEVICE

1) Low Cost.
2) Sequentially addressable radius measurements on all 18 PMSAs using six ADM beam positions and 18 subaperture masks.
3) Radius measurement with 20 μm accuracy and 50 m range.
4) Course phasing.
5) High accuracy differential measurement of absolute distance (between ring mirror and PMSAs).
6) Ring mirror at PM image plane is used as zero reference point for the ADM.
7) Differential ADM measurement is insensitive to OPD changes from the pentaprism steering mirrors and the PTE windows.

Table 3 below provides a parts list for the elements of the system configuration shown in FIG. 1c. The nulling device and the interferometer are not included.

TABLE 3

ADM RADIUS MEASUREMENT CONFIGURATION

| ITEM # | PART | PURPOSE | QTY. |
|---|---|---|---|
| 1 | Optical breadboard | Mount ADM components | 1 |
| 2 | Optical breadboard fixturing | 3 or 4 mount points | 4 |
| 3 | ADM | Absolute Distance Metering (ADM) | 1 |
| 4 | Fold mirror | Fold beam, HR coating @ 780 nm | 4 |
| 5 | Fold mirror mount | Tip/tilt mount for fold mirror | 4 |
| 6 | Down collimator | Down collimate ADM beam from 10 mm to 4.25 mm dia. | 1 |
| 7 | Pentaprism | Perpendicular beam scanning | 2 |
| 8 | Linear stage | Addressable ADM XY-beam positions | 2 |
| 9 | BS plate | Beamsplitter plate AR @ 687 nm, HR @ 780 nm | 1 |
| 10 | Custom aperture mask | Selectable PMSA and ring mirror apertures | 1 |
| 11 | Linear slide | Single axis positioning of aperture mask | 1 |

It is contemplated that the present invention's ADM beam is pre-aligned in the laboratory to be coincident with the interferometer beam. As such mirror 28 may be a tip-tilt mirror that is angularly adjusted so that the ADM beam is coincident with the interferometer beam. Once aligned, the ADM beam may be used to measure distance to an optical surface under test.

Although the invention is illustrated and described herein with reference to specific embodiments, the invention is not intended to be limited to the details shown. Rather, various modifications may be made in the details within the scope and range of equivalents of the claims and without departing from the invention.

For example, the distance to any optical surface under test may be determined using a range finder, a nulling device, a ring mirror and a steerable aperture plate. If desired, an interferometer beam may be used to align the range finder beam to the interferometer beam, so that both are normal to the optical surface under test. In addition, other types of prisms or mirror assemblies may be substituted for the two pentaprisms and used to steer the range finder beam toward a surface under test. Furthermore, a reflective nulling device is illustrated herein. A refractive nulling device, however, may be used instead of the reflective nulling device.

What is claimed:

1. A system for measuring distance to an optical surface of a telescope comprising
   a range finder for transmitting a beam toward the optical surface of the telescope, and
   a ring mirror disposed between the range finder and the optical surface of the telescope,
   wherein the ring mirror has (a) a circumferential reflecting surface for reflecting a portion of the transmitted beam back to the range finder, and (b) a central aperture for passing another portion of the transmitted beam toward the optical surface of the telescope, and
   the circumferential reflecting surface is effective in providing a zero reference point for the range finder, and
   the central aperture is effective in passing the transmitted beam to the optical surface for addressing the optical surface of the telescope.

2. The system of claim 1 wherein
   the transmitted beam is steerable for (a) providing the zero reference point circumferentially about the reflecting surface, and (b) providing sequential addresses to locations on the optical surface.

3. The system of claim 2 including
   a multi-surfaced prism, disposed between the range finder and the ring mirror, for steering the transmitted beam.

4. The system of claim 3 wherein
   the multi-surfaced prism includes two pentaprisms for, respectively, steering the transmitted beam in X and Y planes of an X,Y,Z Cartesian coordinate system, in which the transmitted beam is transmitted and reflected in the Z plane.

5. The system of claim 1 including
   a movable mask having a plurality of apertures, disposed between the range finder and the ring mirror, for selectively imaging the optical surface at the different locations on the optical surface.

6. The system of claim 1 including
   a nulling device disposed between the ring mirror and the optical surface for imaging the transmitted beam on the optical surface.

7. The system of claim 1 including
   a pressure tight enclosure (PTE) for housing the range finder and the ring mirror.

8. The system of claim 1 including
   an interferometer providing an interferometer beam for aligning the interferometer beam with the beam of the range finder.

9. The system of claim 8 wherein
   a tip-tilt mirror is disposed between the range finder and the ring mirror for aligning the interferometer beam with the transmitted beam of the range finder.

10. The system of claim 1 including folding mirrors for intercepting the transmitted beam and lengthening a distance between the range finder and the optical surface.

11. The system of claim 1 wherein
    the range finder includes a laser range finder for transmitting a laser beam toward the optical surface.

12. A system for measuring distance to a mirror surface of a telescope comprising
    a range finder for transmitting a beam to the mirror surface of the telescope, and
    a null assembly disposed between the range finder and the mirror surface for directing the beam at a substantially normal angle with respect to the mirror surface of the telescope, wherein the directed beam is returned to the range finder for measuring the distance to the mirror surface of the telescope,
    a ring mirror is disposed between the range finder and the null assembly for reflecting a portion of the beam toward the range finder, and
    the portion of the beam reflected toward the range finder is used to measure a zero reference point by the range finder.

13. The system of claim 12 wherein
    the ring mirror includes a central aperture for transmitting another portion of the beam toward the null assembly, and
    the null assembly directs the other portion of the beam at the substantially normal angle with respect to the mirror surface.

14. The system of claim 12 including
    a multi-surfaced prism disposed between the range finder and the null assembly for selectively steering the beam to different locations on the mirror surface.

15. The system of claim 12 including
    a central aperture disposed between the range finder and the null assembly, and
    an objective lens disposed between the central aperture and the null assembly,
    wherein the central aperture transmits the beam to the objective lens, and
    the objective lens focuses the beam at a point located between the objective lens and the null assembly.

16. A system for aligning a beam onto a surface under test and using the beam to measure distance to the surface under test, comprising a range finder for emitting a pulsed beam toward the surface under test, and
    an interferometer for transmitting a continuous wave (CW) beam toward the surface under test,
    wherein the pulsed beam is first aligned with respect to the CW beam, and the pulsed beam is next used to measure the distance to the surface under test, and
    the range finder receives a reflected pulsed beam from the surface under test,
    a ring mirror is disposed between the range finder and the surface under test,
    the ring mirror includes a reflecting surface for reflecting a portion of the emitted pulsed beam back to the range finder, and
    the ring mirror includes an aperture for passing the reflected pulsed beam from the surface under test back to the range finder.

17. The system of claim 16 wherein
    the range finder and the interferometer are disposed in a pressure tight enclosure (PTE) at ambient temperature and pressure.

18. The system of claim 17 wherein
    the pulsed beam and the CW beam are subjected to similar windows in the PTE for transmission of the respective beam toward the surface under test.

19. The system of claim 18 wherein
    the pulsed beam transverses a plurality of fold mirrors for lengthening a distance to the surface under test.

* * * * *